Sept. 25, 1928.
G. FORNACA
1,685,450
BRAKE OF THE EXPANDING SHOE TYPE
Filed Sept. 20, 1926
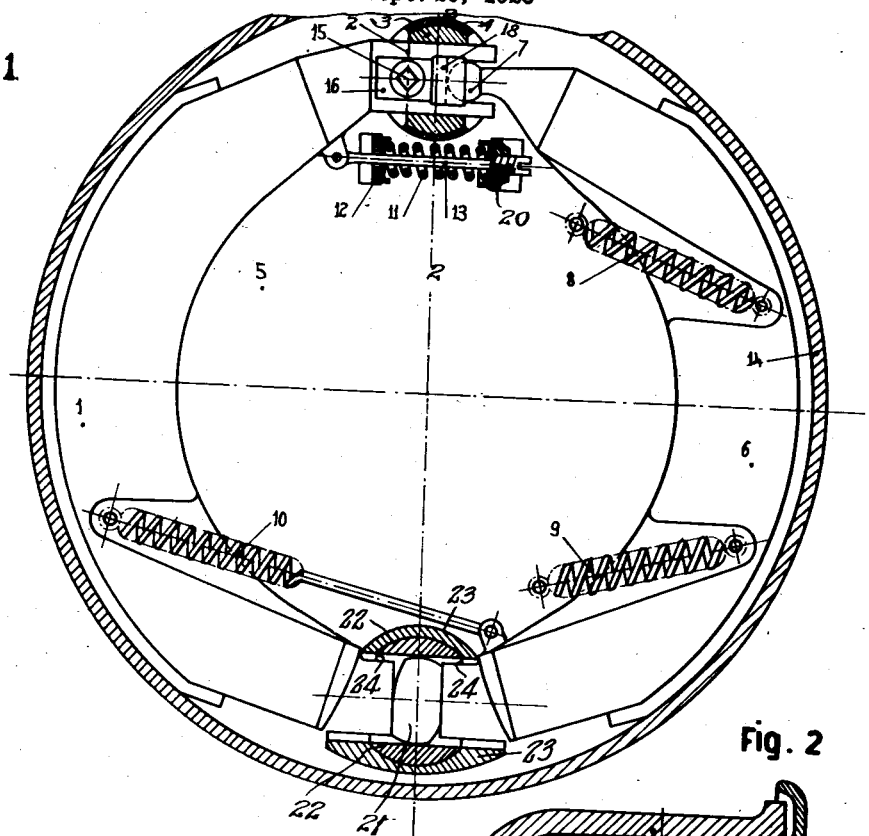
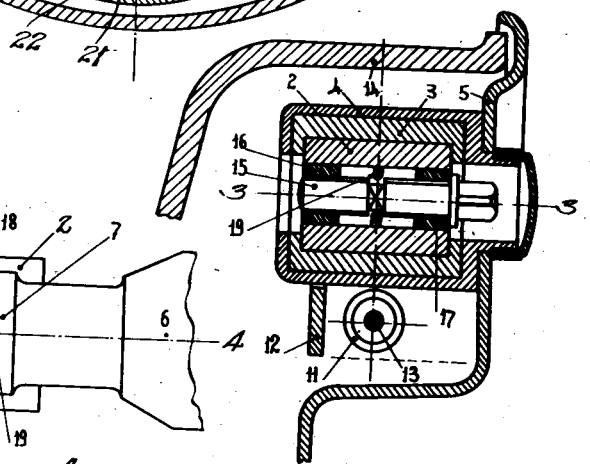
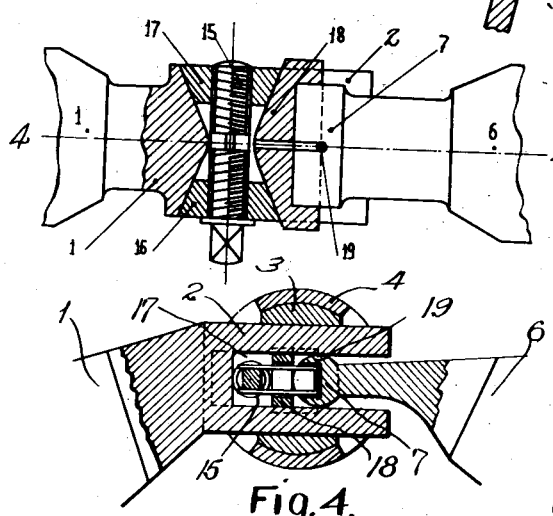

Patented Sept. 25, 1928.

1,685,450

UNITED STATES PATENT OFFICE.

GUIDO FORNACA, OF TURIN, ITALY.

BRAKE OF THE EXPANDING-SHOE TYPE.

Application filed September 20, 1926, Serial No. 136,592, and in Italy September 28, 1925.

This invention relates to expanding shoe brakes of the kind in which the actual braking action is created automatically by the rotation of the brake drum in either direction. Its object is to provide a new arrangement for supporting, centering and controlling the brake shoes.

Accordingly, I provide a brake of the kind stated characterized in that the shoes are formed at one end with a forked and a curved head respectively engaging one with the other and supported by means of a sleeve or thrust member capable of pivotal movement in a fixed bearing, so that the shoe that comes first in the direction of rotation of the brake drum may transmit to the other shoe the thrust it receives from said drum.

A shoe adjustable arrangement, of the screw-controlled wedge type, is or may be provided between the base of said fork and a bearing piece for the head of the other shoe.

By way of example, one constructional form of the improved brake is illustrated on the accompanying drawing, whereon:—

Fig. 1 is a sectional elevation of the brake;

Fig. 2 is a section, on an enlarged scale, on the line 2—2 of Fig. 1; and

Fig. 3 is a section on the line 3—3 of Fig. 2.

Fig. 4 is a section of line 4—4 of Fig. 3.

As illustrated, the end 2 of the shoe 1 is fork-shaped and engages in a slot in a thrust sleeve or member 3 capable of oscillating in a bearing 4 secured to the fixed support 5. This arrangement allows the shoe 1 to swing on the centre of the bearing 4 while the fork-shaped end 2 may also slide in the slot of the thrust plate 3. The other shoe 6 has a curved head 7 that fits in a bearing piece 18 on the fork. Obviously, the arrangement can be inverted, the action of the two shoes being reversible.

The lower ends of said shoes abut against opposite sides of a cam 21 rotatably mounted in a bushing 22 which is removably mounted in a tubular bearing 23 projecting from the fixed support 5. The bushing is preferably of cylindrical form and provided with two oppositely situated lateral openings 24 in which said lower ends of the shoes project. The bushing is held in the bearing by the ends of the shoes and may be removed from the bearing together with the cam by withdrawing the ends of the shoes out of said openings.

Contact between the shoe ends and between the shoes and the operating cam 21 is effected by springs 8, 9 and 10, while a spring 11, mounted on a bearing 12 secured to the fixed support 5, maintains, by means of a rod 13, both shoes exactly centered with respect to the brake drum 14. By means of a screw nut 20 on the threaded end of rod 13 it is possible to control the position of the fork 2 and therefore to adjust the play of the shoe 1.

It is also possible to adjust the shoe 6 by simply inserting in the fork a play adjusting device consisting of a right and left handed screw 15 threaded into two wedges 16 and 17 that may be brought nearer to or farther away from one another by rotating the screw 15. These wedges bear against the base of the fork 2 of the shoe 1 and against the bearing piece 18 interposed between them and the head 7 of the shoe 6.

When the wedges 16 and 17 are drawn near to each other, the shoes 1 and 6 are moved apart and therefore the play between the shoe 6 and the drum 14 is reduced.

The bearing piece 18 may be eliminated and the end 7 made cone-shaped.

A forked spring 19 acts on a square part of the screw stem and prevents its free rotation though allowing it to be rotated by hand.

In the operation of the brake, the lower ends of the shoes 1 and 6 are expanded in known manner by the cam 21 and then, as hereinbefore stated, one of the shoes receives an upward thrust from the drum, according to the direction of rotation, which thrust is transmitted to the other shoe through the forked and curved heads, so that the actual braking effort is effected automatically.

What I claim is:

1. In a brake of the expanding shoe type, the combination with a brake drum, shoes cooperating with said drum, a supporting member, and a cam in the latter for operating said shoes, of a fork on one end of one of said shoes, a thrust member in which said fork is slidably mounted, a bearing in said supporting member in which the thrust member is rotatably mounted, and a curved head at the adjacent end of the other shoe fitted in said fork to receive and transmit the thrust according to the direction of rotation of the brake drum.

2. In a brake of the expanding shoe type, the combination with a brake drum, shoes cooperating with said drum, a supporting member, and a cam in the latter for operating said shoes, of a fork on one end of one of said shoes, a thrust member in which said fork is slidably mounted, a bearing on said supporting member, in which the thrust member is rotatably mounted, a curved head at the adjacent end of the other shoe fitted in said fork to receive and transmit the thrust according to the direction of rotation of the brake drum, and means between the fork bottom and the curved head for adjustment of the shoes.

3. In a brake of the expanding shoe type, the combination with a brake drum, shoes, co-operating with said drum, a supporting member, and a cam in the latter for operating said shoes, of a fork on one end of one of said shoes, a thrust member on which said fork is slidably mounted, a bearing in said supporting member, on which the thrust member is rotatably mounted, a curved head at the adjacent end of the other shoe fitted in said fork to receive and transmit the thrust according to the direction of rotation of the brake drum, and a screw controlled wedge device between the fork bottom and the head of the adjacent shoe.

4. In a brake of the expanding shoe type, the combination with a brake drum, shoes co-operating with said drum, a supporting member, and a cam in the latter for operating said shoes, of a fork on one end of one of said shoes, a thrust member in which said fork is slidably mounted, a bearing in said supporting member, on which the thrust member is rotatably mounted, a curved head at the adjacent end of the other shoe fitted in said fork to receive and transmit the thrust according to the direction of rotation of the brake drum, and a spring device for maintaining both shoes centered.

5. In a brake of the expanding shoe type, the combination with a brake drum, shoes co-operating with said drum, a supporting member, and a cam in the latter for operating said shoes, of a fork on one end of one of said shoes, a thrust member in which said fork is slidably mounted, a bearing in said supporting member on which the thrust member is rotatably mounted, a curved head at the adjacent end of the other shoe fitted in said fork to receive and transmit the thrust according to the direction of rotation of the brake drum, means between the fork bottom and the curved head for adjustment of the shoes, and a spring device for maintaining both shoes centered.

6. In a brake of the expanding shoe type, the combination with a brake drum, shoes co-operating with said drum, a supporting member, and a cam in the latter for operating said shoes, of a fork on one end of one of said shoes, a thrust member in which said fork is slidably mounted, a bearing in said supporting member in which the thrust member is rotatably mounted, a curved head at the adjacent end of the other shoe fitted in said fork to receive and transmit the thrust according to the direction of rotation of the brake drum, a screw controlled wedge device between the fork bottom and the head of the adjacent shoe, and a spring device for maintaining both shoes centered.

In testimony that I claim the foregoing as my invention I have signed my name.

GUIDO FORNACA.